INVENTORS
RALPH E. GREY
EDWARD M. GAVIN

Patented Apr. 27, 1948

2,440,262

UNITED STATES PATENT OFFICE 2,440,262

FUEL SUPPLY SYSTEM FOR AIRCRAFT

Ralph E. Grey and Edward M. Gavin, Osborn, Ohio

Application February 16, 1942, Serial No. 431,114

15 Claims. (Cl. 158—36)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an improved fuel system for aircraft and more particularly to a fuel system suitable for use on large aircraft having a plurality of engines and a plurality of fuel reservoirs for supplying those engines with fuel. In installations of this nature it is customary to provide each engine with its own individual fuel tank from which it normally receives its supply of fuel. It is desirable, however, that if necessary, the fuel from a particular tank may be supplied to engines other than its own. For example, if one of the engines should become disabled for any reason, the fuel in its tank might be needed for the continued operation of the remaining engines. Or, in the event that a reserve tank be carried in the aircraft, it is, of course, necessary that the fuel therein be made available to any one or all of the engines on the craft. Another desideratum of any fuel supply system is that it be possible to transfer fuel from any one of the tanks to any other tank or tanks. For instance if a leak occurs in one of the tanks either from natural causes or as the result of enemy gunfire, it becomes desirable to transfer the fuel from the leaking tank into another tank on the aircraft both for the purpose of conserving fuel and also to eliminate the fire hazard resulting from the escaping gasoline. A fuel transfer system is also advantageous from the standpoint of balancing the load carried by the aircraft, it being possible with such a system to move the fuel from one tank to another so as to keep the center of gravity of the aircraft in its proper location. The improved fuel system which forms the subject of our invention provides both for the cross-feeding of fuel between engines and also for the transfer of fuel from one tank to another. It also constitutes what we believe to be the simplest, lightest and most expeditious system of this type yet devised.

We acknowledge it to be old and well known in the art of fuel systems for multiengined craft to provide a separate fuel tank for each of the engines together with a cross-feed fuel line for enabling the fuel to be delivered from one of the tanks to an engine or engines other than its own. An arrangement such as this is shown on page 60 of a book entitled "A. M. Fuel Systems for Aircraft," written by Basile Demtchenko and published by Gauthier Villars, 55 Quai des Grands-Augustins, Paris, in 1938. In this system each engine is provided with its own separate tank and with a short, direct tank-to-engine fuel line for conveying the fuel from the tank to the engine. A cross-feed fuel line joins together all of the tank-to-engine lines and fuel cocks are provided in the cross-feed line between the engine-tank units in order that the units may be separated by the closing of the cocks. Cocks are also provided in the tank-to-engine fuel lines at a point intermediate the tank and cross-feed line to permit isolation of each tank from the rest of the system. This arrangement suffers from several disadvantages, however, one being that when it is desired to cut out one of the tanks and feed its engine from one of the other tanks, it is necessary to close the tank cock and to open the cock in the cross-feed line. Thus it is necessary to operate two cocks to effect the desired result. In our improved system, however, the operation of a single valve or cock located at the intersection of the tank-to-engine and cross-feed lines serves to simultaneously isolate the tank and also to connect its engine to the cross-feed line.

Another disadvantage of the system disclosed by Demtchenko lies in the fact that the cross-feeding of fuel is restricted to adjacent engines; that is, in a four-engined aircraft it is impossible to supply engines 1 and 3 from the tank of engine 1. Engine 2 must also be included with engines 1 and 3 although under certain circumstances this may not be desirable. According to our invention a three-way valve or cock is provided at each juncture of the cross-feed line with a tank-to-engine line thus making it possible to supply non-adjacent engines with fuel from the tank of one of them without bringing in the intermediate engines. It is also possible with our new system to connect one or more reserve tanks to the cross-feed line by a simple T fitting whereby any selected engine or engines may be supplied with fuel from the reserve tanks by simply setting the valve of the engine or engines in such a position as to connect the latter with the cross-feed line.

Another important feature of our improved system resides in the use of booster pumps located adjacent to each of the fuel tanks for transferring fuel from one tank to the other. While we are aware that the use of booster pumps per se is old, we believe that we are the first to use these pumps for a dual purpose, viz., the lifting of fuel to the engine pumps and also the pumping of fuel from one tank to another in fuel transfer operations. By setting the valves of the tanks between which fuel is to be transferred to their cross-feed positions, and then starting the booster pump of the tank from which fuel is to be drawn and stopping the booster pump of the tank to which fuel is to be delivered, a transfer of fuel between the tanks may be effected. Inasmuch as the booster pumps are of the centrifugal type no difficulty is encountered in passing fuel through the pump which is at rest. Thus the same pumps, valves and fuel lines, which are used for delivering fuel to the engines both directly and also by means of the cross-feed line are also used for transferring fuel from one tank to the other. No additional equipment is necessary for accomplishing this function as is the case in all of the present systems with which we are familiar.

It is therefore evident from the above that the fuel system which forms the subject of our invention is an extremely flexible one, it being possible to route the fuel from practically any point in the system to any other point therein. At the same time the system is simple in nature and light in weight, the length of the fuel lines being considerably shortened and the number of valves, cocks, remote controls, etc., being greatly reduced in number. As a result of the shortening of the lines in our system it becomes feasible to use flexible bulletproof hose in place of the thin-walled aluminum tubing customarily used for fuel lines. Hitherto it has always been impractical to use the bulletproof hose in place of the aluminum tubing, due to the greater weight of the former. The use of flexible hose greatly simplifies the installation and maintenance of the lines and also reduces the possibility of failure due to vibrational fatigue. The simplification of the system and the reduction in the number of fittings and controls used therein also greatly reduces the vulnerability of the system to damage from enemy gunfire or shrapnel, there being fewer lines and fewer vital elements interposed in those lines for bullets to hit.

Accordingly, the principal object of our invention is to provide an improved fuel system for multiengined aircraft in which both cross-feeding and transferring of fuel may be effected and which, at the same time, is extremely simple in nature and is comprised of relatively few parts.

Another object of our invention is to provide a fuel system of the type described above in which a three-way valve or cock is located at the intersection of each tank-to-engine fuel line with the cross-feed fuel line. This arrangement greatly increases the usefulness of the system and at the same time simplifies it.

A further object of our invention is to provide a novel fuel-transfer system in which a booster pump located adjacent to the bottom of each fuel tank may be used to draw fuel out of the tank, pump it through the cross-feed fuel line, and deliver it into any selected one of the remaining tanks.

Still a further object of our invention is to provide a reserve fuel tank which is connected through a booster pump to the cross-feed line. By means of the above-mentioned three-way valves the fuel in the reserve tank may be fed to any selected ones of the engines and, by means of the associated booster pump, may be transferred to any of the other fuel tanks.

In general our improved fuel system is comprised of a plurality of fuel tanks, there being one such tank for each of the engines of the plane. Each tank is connected to its respective engine by means of a direct fuel line extending therebetween. Interposed in each of these fuel lines is a three-way valve or cock which is remotely controlled from the dashboard of the aircraft. A cross-feed fuel line is provided which communicates with one of the ports on each of the valves and also with the fuel line leading to the reserve tank or tanks. Inasmuch as the valves are operated by a remote control arrangement, these valves may be placed in the wings of the aircraft so as to enable the tank-to-engine fuel lines to be made as short as possible. A centrifugal type of booster pump is located in or adjacent to the bottom of each fuel tank for the purpose of supplying fuel from said tank to the three-way valve and engine under pressure. The reserve tanks are also provided with a centrifugal booster pump for supplying the fuel therein under pressure to the cross-feed line. Thus by a proper setting of the three-way valves it is possible to supply any or all of the engines from one of the fuel tanks or from the reserve tank. The booster pump of the tank which is selected for supplying the fuel to the engines is ordinarily utilized to deliver the fuel through the cross-feed line under pressure. However, since each of the engines is provided with its own fuel pump it is not essential that the booster pump be utilized for the delivery of fuel to the engines. In the event that the booster pump becomes disabled the engines will still be able to draw up fuel from the tank since the booster pump is of a centrifugal type and fuel may flow therethrough even though the pump is not operating. In this case the previously mentioned engine pumps will be able to draw fuel from the tank up to their respective engines provided that the aircraft is not flying at an excessive altitude. For high-altitude flight the operation of the booster pump is essential in order to prevent a vapor lock from occurring in the fuel lines.

It is also possible by a proper setting of the three-way valves to transfer fuel from one of the tanks to any of the other tanks, the booster pump of the tank from which fuel is being withdrawn being utilized to supply the necessary pressure for effecting the transfer. In this instance, of course, the operation of the booster pump for the tank to which the fuel is to be delivered must be stopped so as to permit the fuel to flow therethrough and into the tank.

From the above it will be apparent that we have devised a fuel system which combines flexibility of operation with extreme simplicity of construction. It should also be noted that our system will accomplish all of the results obtainable with the older systems and that it accomplishes these results with much fewer parts and with much shorter fuel lines.

A more detailed description of a typical fuel system embodying the principals of our invention will now be described in detail in connection with the drawings, in which.

Figure 1:
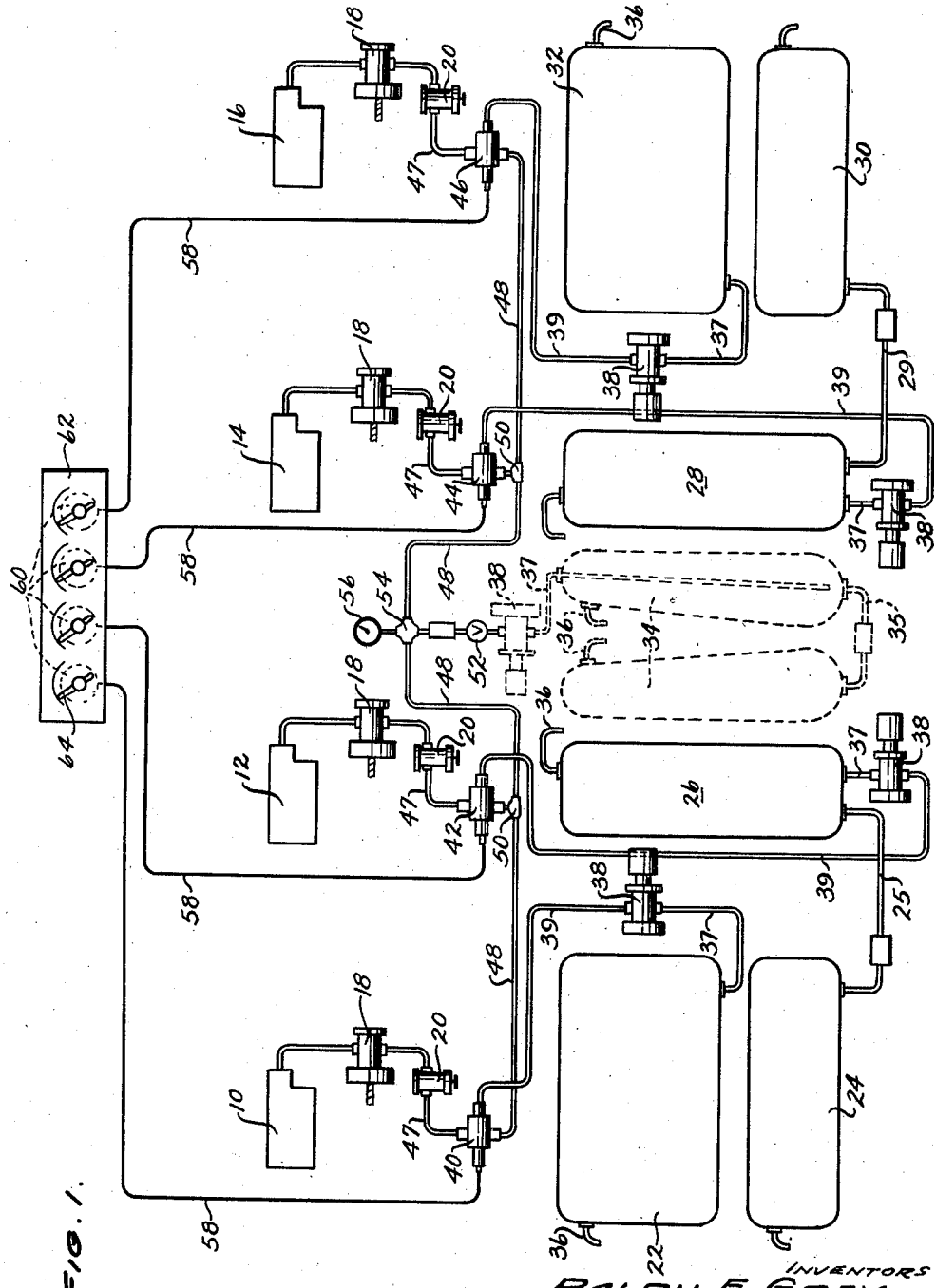
Figure 1 is a diagrammatic view showing the various components of the system and the manner in which they are associated with one another. The view is strictly diagrammatic and the exact location of the parts shown therein are not to be taken as to position which these parts would occupy in an actual installation of the system on an aircraft.

In Figure 1 is shown a fuel system for a four-engined aircraft which system embodies the principles of our invention. In this view the four engines are not shown but only the carburetors 10, 12, 14 and 16 which are mounted on each of the engines. Each of these carburetors is supplied with fuel under pressure by the four engine pumps 18, fuel strainers 20 being provided ahead of each of the pumps for the purpose of removing any impurities present in the fuel. Fuel is supplied to these strainers from a plurality of tanks which are preferably located in the wings of the aircraft, the tank 22 supplying fuel to the carburetor 10 of the first engine and the tanks 24 and 26 supplying fuel to the carburetor 12 of the second engine. The tanks 24 and 26 are connected with one another by a short fuel line 25 so as to form essentially a single tank for the carburetor 12. It is necessary that the two tanks 24 and 26 be used in place of a single tank similar to 22 because of the limited space available within the aircraft wing. For the same reason tanks 28 and 30, which are joined by a short line 29, take the place of a single tank for the carburetor 14. A tank 32 forms the source of supply for the carburetor 16. Two reserve fuel tanks 34, which may or may not be present in the aircraft, are tied together by a short fuel line 35 so as to form a single source of fuel reserve. Each of the tanks 22 to 34 is provided with an air vent 36 located in the top thereof. A fuel line 37 leads from the bottom of each tank to the intake side of a booster pump 38. While some of these pumps are shown in the figure as being above the bottom of the level of the tanks, it is to be understood that this was done in order to conserve space in the drawing and that in an actual installation each of the pumps would be located below the bottom level of the tank from which it draws fuel. These pumps are preferably driven by individual electric motors with provision made for controlling their operation from the pilot's cabin. The pumps themselves are of the centrifugal type since this form of pump will permit fuel to flow through it even though it is not operating. A fuel line 39 conveys the fuel from the exhaust side of each of the booster pumps to one of the ports of a three-way valve, these valves being designated as 40, 42, 44 and 46 in the drawing. To a second port of each of the valves is connected a short fuel line 47 which conveys the fuel to each of the strainers 20 after which it proceeds through the pumps and carburetors to each of the four engines. A cross-feed fuel line 48 is communicatively connected to a third port of each of the three-way valves, a T fitting 50 being utilized to connect the cross-feed line to each of the valves 42 and 44. A simple cut-off valve 52 is interposed between the booster pump 38 of the reserve source 34 and the cross-feed line 48. A cross 54 serves to connect the line from the reserve source to the cross-feed line 48. A fuel pressure gauge 56 is connected with one of the legs of the cross 54 in order to indicate at all times the pressure of the fuel in the cross-feed line 48. Each of the four valves 40, 42, 44 and 46 is provided with a hydraulic line 58 extending to an operator 60 located on the dashboard 62 of the aircraft. Each of the operators 60 is provided with an elongated handle 64 which serves both to actuate the operator mechanism and also to indicate the position of each of the valves 40, 42, 44 and 46.

Where the system is to be installed on military aircraft it is desirable that the fuel tanks and fuel lines be of bullet-proof construction though the type of construction used in no way alters the principle of our invention.

Figure 2:
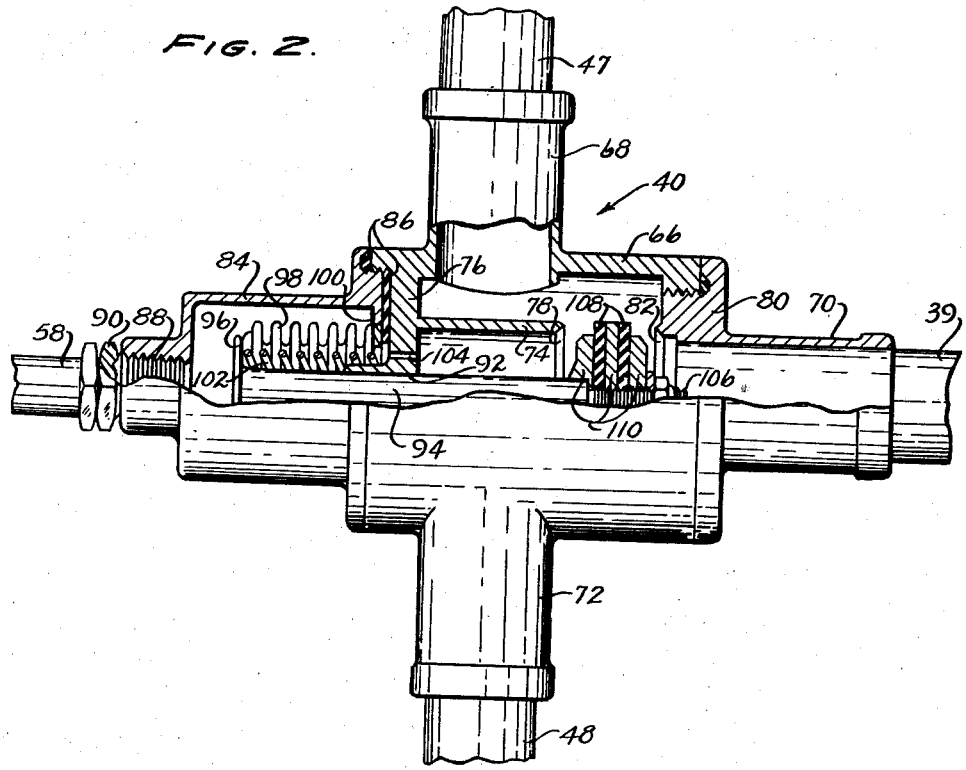
Figure 2 is a detailed view of the three-way valve which is shown partially in cross-section for the purpose of clearly illustrating the exact details of its construction.

Figure 2 is a detailed view of the valve 40 which is interposed between the tank 22 and the carburetor 10. This valve, which is typical of all the valves 40, 42, 44 and 46, consists of a valve body 66 which is provided with three outlet legs, 68, 70, and 72. The fuel line 47 leading to the carburetor and engine is connected to the leg 68; the fuel line 39 leading from the tank to the valve is connected to the leg 70; and the cross-feed line 48 is connected to the leg 72. The legs 68 and 72 are cast integral with the valve body 66, the latter leg communicating with an annular wall 74 which is located in the interior of the body and which projects from the end wall 76 of the body 66. The right-hand edge of the wall 74 is beveled off to form a valve seat 78. The leg 70 is integral with an end housing 80 which is adapted to screw into, and tightly seal against the open end of the body 66. This end cap is provided with a beveled annular surface 82 forming a second valve seat which lies directly in line with the valve seat 78. On the left-hand end of the body 66 is screwed a housing 84 which is tightly sealed against the end wall 76 by means of gaskets 86. The outer end of the housing 84 is provided with a tapped hole 88 for receiving a fluid fitting 90 mounted on the end of a hydraulic line 58. The body 66 is provided with a guide-bearing 92 which slidably receives the valve stem 94. The left-hand end of the valve stem is provided with a flange 96 to which is soldered one end of a Sylphon bellows 98. The other end of the bellows is soldered to a flange 100 formed on the housing 84 thus forming a fluid tight chamber between the outer surface of the bellows and the interior surface of the housing with the exception of the opening for the hydraulic line 58. A compression spring 102 is located within the Sylphon bellows and has one end bearing against the flange 96 and the other end bearing against the end wall 76. This spring tends to constantly extend the bellows so as to move the valve stem 94 into its left-most position. A small hole 104 is drilled through the end wall 76 so as to provide communication between the inside of the bellows and the interior of the valve body. The right-hand end of the valve stem 94 is provided with screw threads 106 by means of which a valve head composed of two sealing washers 108 and three supporting washers 110 may be secured to the right-hand end of the valve stem. The washers 108 may be of any suitable sealing material such as rubber, rubber substitute, leather, etc. The use of a rubber substitute such as neoprene is preferable since this material is not affected by gasoline. The valve stem 94 is adapted to be moved back and forth within the valve body by means of fluid pressure in the hydraulic line 58 and in the housing 84. When the pressure on the hydraulic fluid contained in the line and housing is released the valve will be free to move toward the left under the influence of the spring 102 to cause the valve head to press against the valve seat 78 and thus seal off the cross-feed port from the interior of the valve body. Fuel entering the valve body through the line 39 from the fuel tank will be free to flow through the interior of the valve body and out through the line 47 to the carburetor 10. The cross-feed line 48, however, will be effectively sealed off from the tank-to-engine fuel line. Upon moving a predetermined amount of hydraulic fluid into the housing from the line 58, the bellows 99 and the spring 102 will be compressed and the valve head will be moved to its intermediate position as shown in Figure 2. Any air or fuel within the interior of the Sylphon bellows will be permitted to escape through the hole 104 so as not to interfere with the compressing thereof. With the valve head in its central or intermediate position all three legs of the valve communicate with the interior of the valve body 66 and fuel from the tank line 39 will be free to flow through both the engine line 47 and also the cross-feed line 48. Upon moving an additional amount of fluid into the housing from the line, the bellows and spring will be compressed still further and the valve head will be pressed against the seat 82 so as to seal off the leg 70 and the tank line 39 from the interior of the valve body. The legs 70 and 68 will now be in communication with one another and fuel will be free to flow from the cross-feed line 48 through the valve and out into the engine line 47.

Figure 3:
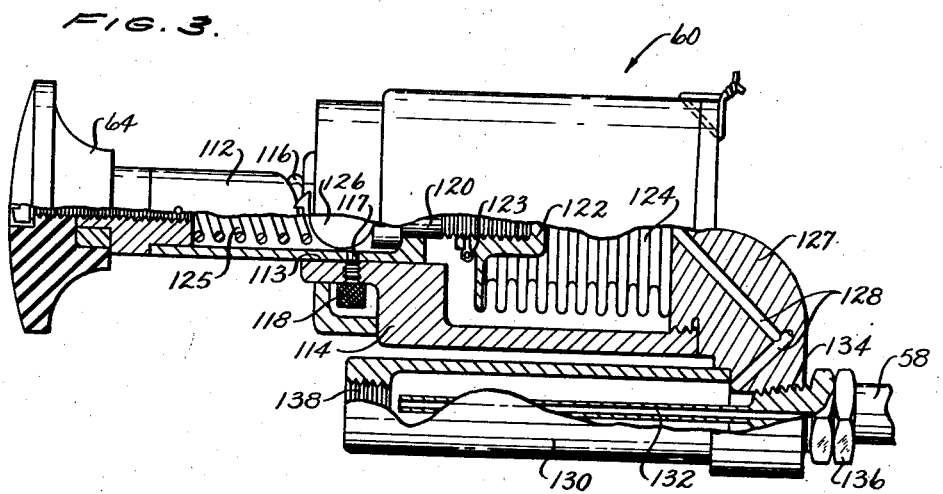
Figure 3 is a detailed view of the operator for the valve which is located on the dashboard of the aircraft. This view is shown partially in cross-section so as to reveal the construction of parts located in the interior of the device.

The operator 60 which serves to control the position of the valve 40 is shown in detail in Figure 3. This device has an operating handle 64 of elliptical shape which is fastened to one end of a sleeve 112. This sleeve is slidably received in a guide-bearing 113 formed in one end of the operator body 114. In the sleeve is cut a helical groove 116 which cooperates with the projecting end 117 of a screw 118 mounted in the body 114. Thus as the handle 64 is rotated the sleeve 112 will be moved in or out of the body depending upon the direction of rotation of the handle. The right-hand end of the sleeve 112 is flanged to receive the head of a bolt 120 the right-hand end of which screws into a flanged head 122 to which is soldered one end of a Sylphon bellows 124. A cotter pin 123 serves to prevent turning movement between the head 122 and the bolt 120. A compression spring 125 in the interior of the sleeve 112 acts through a steel ball 126 to keep the bolt 120 in position with its head pressed against the flange provided in the end of sleeve 112. The right-hand end of the bellows 124 is soldered to the face of an end-housing 127 which is screwed into the open end of the body 114. The ports 128 drilled in the housing 127 as shown in Figure 3, serve to establish communication between the interior of the bellows and the interior of a cylinder 130 fastened and sealed to the housing 127. A filler tube 132 extends within the cylinder, as shown, this tube being screwed into the housing at 134. The hydraulic line 58 is connected to the right-hand end of the filler tube by means of a fluid fitting 136. Communication between the line and the interior of the bellows 124 is thus established by means of the filler tube 132, the cylinder 130 and the ports 128. The left-hand end of the cylinder 130 is provided with a tapped hole 138 to accommodate a filling plug. After the system has been filled with hydraulic fluid by means of the hole 138, rotation of the handle 64 of the operator will tend to either compress or expand the bellows 124, depending on the direction of rotation of the handle, and thus either force the fluid contained in the bellows 124 into the line 58 or withdraw the same from the line as the case may be. Each end of the helical groove 116 is provided with a straight portion as is also the central part of the groove. These straight portions serve to determine the three positions of the valve head of the valve 40. The compression spring 125, which resiliently holds the head of the bolt 120 in position against the flange in right-hand end of the sleeve, serves to compensate for any expansion of the hydraulic fluid contained in the remote control system. Thus if the fluid expands and causes the valve head to contact the valve seat 82 before the handle 64 has reached its limit of movement, the spring 125 will yield to permit the sleeve 112 to continue its movement into the operator body without causing corresponding movement of the bolt 120 and the head 122. The face of the handle 64 is provided with an index line which cooperates with an indicator dial on the dashboard 62 of the aircraft so as to indicate to the pilot the position occupied by the fuel control valve 40. This dial is, of course, marked with three positions corresponding to the three positions occupied by the operator handle and also by the valve head, suitable legends being provided on the dial to indicate to the pilot the manner in which the fuel is flowing through the valve at any given instant.

Several sample types of operation which may be performed with our system will now be given:

*Problem 1:*—To deliver fuel from one of the fuel tanks to all four of the engines.

To cause fuel from the tank 22 to be delivered to the four engines of the aircraft, the pilot or copilot, as the case may be, moves valve 40 to its intermediate position by means of the operator handle 64 controlling the same. This will then permit the fuel from the tank 22 to flow both to the carburetor 10 and also into the cross-feed line 48. By means of the other operator handles 64 the valves 42, 44 and 46 are then positioned with the valve head contacting the valve seat 82 so as to permit fuel to flow from the cross-feed line 48 into the lines 47 leading to the carburetors 12, 14 and 16. At the same time the three tank lines 39 will be blocked off so as to isolate the three remaining tanks from the remainder of the system. Thus the fuel delivered from the tank 22 into the cross-feed line 48 will be delivered to the three carburetors 12, 14 and 16 in addition to the carburetor associated with the tank 22. The operation or non-operation of the booster pumps 38 is immaterial in this particular problem provided the aircraft is not flying at an excessive altitude, say 12,000 feet or above. If the craft is operating above 12,000 feet it will be necessary to have the booster pump associated with the tank 22 in an operative condition in order to lift the fuel up to the four engine pumps 18.

*Problem 2:*—To deliver fuel from the reserve tanks 34 to all four of the engines.

The operator handles 64 for all four of the valves are moved so as to position the valve heads against the seats 82 of their respective valve bodies. This will connect each of the engine lines 47 with the cross-feed line 48 and at the same time seal off the tank lines 39. The cut-off valve 52 for the reserve tanks 34 is then opened so as to permit fuel from the reserve tanks to flow into the cross-feed line at the connection 54. Fuel from the reserve tanks will now be permitted to flow through the cross-feed line to each of the valves 40, 42, 44 and 46 where it will be directed into each of the four engine lines 47. Here again the operation or non-operation of the booster pumps 38 is immaterial unless the aircraft is flying at an excessive altitude. If this is the case it will be necessary that the booster pump 38 associated with the reserve tanks 34 be operating so as to lift the fuel up to the four engine pumps 18.

*Problem 3.*—To transfer fuel from one tank to another tank.

If it is desired that fuel from the tank 22 be transferred to the tank 32, the operator handle 64 for the valve 40 is moved so as to place the valve in its intermediate position. This will permit the fuel from the tank 22 to flow into the valve and out through the engine line 47 and the cross-feed line 48. The operator handle for the valve 46 is likewise moved so as to position the valve in its intermediate position so as to establish communication between all three of the fuel lines entering this valve. The booster pump 38, associated with the tank 32, is then silenced and the booster pump of the tank 22 rendered operative. Fuel from the tank 22 will thus be supplied under pressure both to its own engine and also to the cross-feed line. From the cross-feed line fuel will flow through the valve 46 to the carburetor 16 and also to the tank 32. Since the booster pump of the tank 32 is stopped, the fuel will have no difficulty in passing through this pump in the reverse direction. Thus, as a result of the pressure developed by the pump of the tank 22, fuel therefrom will be forced through the cross-feed line and into the tank 32. During this operation the engines associated with the carburetors 12 and 14 may continue to operate in the normal manner with fuel being supplied directly from their associated tanks through the valves 42 and 44 and into the engine lines 47. To accomplish this the operator handles 64 for the valves 42 and 44 are moved so as to seat the heads of these two valves against the seats 78, thus permitting a direct flow of fuel from the tank lines 39 to the engine lines 47, the cross-feed line 48 being sealed off in each case.

*Problem 4.*—To transfer fuel from the reserve tanks 34 to one of the engine tanks.

If it is desired that fuel from the reserve tanks 34 be transferred into the tank 22 the operator handle 64 for the valve 40 is moved so as to place this valve in its intermediate position. The booster pump 38 associated with the tank 22 is then stopped and the booster pump associated with the reserve tank 34 is set into operation after opening the valve 52. Thus fuel will be delivered from the reserve tanks into the cross-feed line under pressure so as to cause the fuel to flow through the valve 40 and into the tank 22. At the same time the engine associated with the tank 22 will be supplied with fuel through the line 47, it being recalled that the valve 40 is in its intermediate position with all three of the fuel lines entering the valve in communication with one another. The remaining three engines may be supplied with fuel from their respective tanks while this fuel transfer operation is being carried out by so moving the operator handles 64 for the three valves 42, 44 and 46 as to seat the valve heads against the valve seats 78, thus permitting a direct flow of fuel through the valves from the tank lines 39 to the engine lines 47.

During fuel transfer operations the fuel pressure gauge 56 connected with the cross-feed line will be operative to indicate the pressure of the fuel in the cross-feed line and thus indicate to the pilot that the transferring operation is proceeding satisfactorily.

The examples set out above are typical of cross-feed and transfer operations which may be performed with our improved fuel system. It will be evident, however, that many variations of these operations may be carried out with various settings of the valves 40 to 46 and selective operation or non-operation of the different booster pumps 38. Since it would be impossible within the space of this description to bring out all of the possible permutations available with our system, only the four basic types of operation have been described in detail. It will be evident, however, from the above description of our improved system that, by a simple manipulation of the appropriate operator handle 64 on the dashboard of the aircraft, the pilot may quickly and readily adjust any one of the three-way valves to the desired position. By means of these valves the cross-feed of fuel between engines is controlled as is also the transfer of fuel from one tank to another. In transferring fuel between tanks it is necessary to stop the booster pump of the tank into which fuel is being pumped, and, inasmuch as these pumps are preferably driven by electric motors, it is a simple matter to provide suitable starting and stopping switches for these motors on the dashboard of the aircraft. Thus all controls are placed within easy reach of the pilot and the flow of fuel through the system may be readily and quickly controlled by manipulation of the dashboard controls.

It is to be understood that the particular embodiment of our invention, which has been described above, is for purposes of illustration only and that our invention is not to be construed as limited to the arrangement herein disclosed. The extent of our invention is rather to be determined by the scope of the appended claims which follow.

What we claim as new and desire to secure by Letters Patent is:

1. A fuel supply system for multiengined aircraft comprising a plurality of fuel outlet means, a fuel reservoir means associated with each of said outlet means, an individual conduit communicatively connecting each of said outlet means with its associated reservoir means, a valve interposed in each of said conduits, and a cross-feed conduit communicatively connected with each of said valves, said valves each having a selectively settable control member for enabling fuel to be delivered from any selected reservoir means to any selected outlet means.

2. A fuel supply system for multiengined aircraft comprising a plurality of fuel outlet means, a fuel reservoir means associated with each of said outlet means, an individual conduit communicatively connecting each of said outlet means with its associated reservoir means, a selector valve interposed in each of said conduits, each of said valves having a control member settable to any one of a plurality of positions, a cross-feed conduit communicatively connected with each of said valves, and means for individually controlling the setting of each of said control members so as to enable fuel to be delivered from any selected reservoir means to any selected outlet means.

3. A fuel supply system for multiengined aircraft comprising a plurality of fuel outlet means, a fuel reservoir means associated with each of said outlet means, an individual conduit communicatively connecting each of said outlet means with its associated reservoir means, a multiway valve interposed in each of said conduits, each of said valves having a control member capable of being moved into any one of a plurality of positions, a cross-feed conduit communicatively connected with each of said valves, and means for individually controlling the position of each of said control members so as to enable fuel to be delivered from any selected reservoir means to any selected outlet means.

4. A fuel supply system for multiengined aircraft comprising a plurality of fuel outlet means; a fuel reservoir means associated with each of said outlet means; and a valve interposed between each outlet means and its associated reservoir means, each of said valves comprising a multiport valve body having one port communicatively connected with the outlet means, a second port communicatively connected with the reservoir means, and a third port communicatively connected with a corresponding port of each of the other of said valves, and a positionable selector means for controlling the flow of fuel through said valve body and between said ports whereby fuel may be delivered from any selected reservoir means to any selected outlet means.

5. A fuel supply system for multiengined aircraft comprising a plurality of fuel outlet means; a fuel reservoir means associated with each of said outlet means; and a valve interposed between each outlet means and its associated reservoir means, each of said valves being comprised of a multiport valve body, one port of which is communicatively connected with said outlet means, a second port of which is communicatively connected with said reservoir means and a third port of which is communicatively connected with a corresponding port of the other of said valve bodies, and a selector means movable to any one of three positions, said means in one position serving to establish communication between said one port and said second port, in a second position serving to establish communication between all three of said ports and in a third position serving to establish communication between said one port and said third port whereby, with the selector means of one of said valves occupying its second position and with the selector means of other of said valves occupying their third positions, fuel may flow from the reservoir of said one valve to the outlet means both of said one valve and also of said other valves.

6. A fuel supply system for multiengined aircraft comprising a plurality of fuel outlet means; a fuel reservoir means associated with each of said outlet means; and a valve interposed between each outlet means and its associated reservoir means, each of said valves being comprised of a multiport valve body, one port of which is communicatively connected with said outlet means, a second port of which is communicatively connected with said reservoir means and a third port of which is communicatively connected with a corresponding port of the other of said valve bodies, and a selector means movable to any one of three positions, said means in one position serving to establish communication between said one port and said second port, in a second position serving to establish communication between all three of said ports, and in a third position serving to establish communication between said one port and said third port whereby, with the selector means of certain ones of said valves occupying their second positions and the selector means of certain others of said valves occupying their third positions, fuel will be permitted to flow from the reservoirs of said certain ones of said valves to the outlet means thereof and also to the outlet means of said certain others of said valves.

7. In a fuel supply system for multiengined aircraft comprising a plurality of fuel outlet means, a fuel reservoir means associated with each of said outlet means, a selectively operable centrifugal pump located adjacent to each of said reservoir means and communicatively connected therewith for supplying fuel under pressure to said outlet means, each of said pumps being characterized by its ability to pass fuel when inoperative; a conduit communicatively connecting each of said pumps with its associated outlet means, a three-way valve interposed in each of said conduits between said pump and said outlet means, each of said valves being provided with a control member settable to any one of a plurality of positions, a cross-feed conduit communicatively connected with each of said valves, and means for individually controlling the setting of the valve control members so as to enable the pump associated with any selected reservoir means, when rendered operative, to withdraw fuel from that reservoir means and deliver it to any of the remaining reservoir means whose associated pumps have been rendered inoperative.

8. A fuel supply system for aircraft comprising a plurality of fuel outlet means, a fuel reservoir means associated with each of said outlet means, an individual conduit communicatively connecting each of said outlet means with its associated reservoir means, a multiway valve interposed in said conduit, said valve having a control member capable of being moved into any one of a plurality of positions; a selectively operable centrifugal pump interposed in each of said conduits between said valve and said reservoir means, said pump being characterized by its ability to pass fuel when inoperative, a cross-feed conduit communicatively connected with each of said valves, and means for individually controlling the position of the control member of each of said valves so as to enable fuel to be pumped from any selected reservoir means whose associated pump has been rendered operative and delivered to any other selected reservoir means whose associated pump has been rendered inoperative at the same time that fuel is being delivered to the outlet means associated with said selected reservoir means.

9. A fuel supply system for multiengined aircraft comprising a plurality of fuel outlet means; a fuel reservoir means associated with each of said outlet means; a selectively operable pump interposed between each outlet means and its associated reservoir means, said pump being communicatively connected with said reservoir means and being characterized by its ability to pass fuel when inoperative; and a valve interposed between each of said pumps and its respective outlet means, each of said valves being comprised of a multiport valve body, one port of which is communicatively connected with said outlet means, a second port of which is communicatively connected with said pump and a third port of which is communicatively connected with a corresponding port of the other of said valve bodies, and a selector means movable to any one of three positions, said means in one position serving to establish communication between said one port and said second port, in another position serving to establish communication between all three of said ports, and in still a further position serving to establish communication between said one port and said third port whereby, upon effecting a proper setting of the selector means of said valves, fuel may be transferred from any selected reservoir means whose associated pump has been rendered operative to any of the remaining reservoir means whose associated pump has been rendered inoperative and delivered from said selected reservoir means to the outlet means associated with said selected and said remaining reservoir means and also to any other desired outlet means.

10. A fuel supply system for multiengined aircraft comprising a plurality of fuel outlet means, a fuel reservoir means associated with each of said outlet means, an individual conduit communicatively connecting each of said reservoir means with its associated outlet means, a multiway valve interposed in each of said conduits, said valve having a control member settable to any one of a plurality of positions, a cross-feed conduit communicatively connected with each of said valves, a reserve fuel reservoir means, a separate conduit communicatively connecting said last-named means with said cross-feed conduit, and a shut-off valve interposed in said separate conduit for isolating said reserve fuel reservoir means from said cross-feed conduit whereby, upon proper manipulation of said control members, fuel may be delivered from any selected reservoir means to any selected outlet means.

11. A fuel supply system for multiengined aircraft comprising a plurality of fuel outlet means, a fuel reservoir means associated with each of said outlet means, an individual conduit communicatively connecting each of said reservoir means with its associated outlet means, a multiway valve and a centrifugal pump interposed in each of said conduits, said valve being located between said pump and said outlet means and being provided with a control member settable to any one of a plurality of positions, a cross-feed conduit communicatively connected with each of said valves, a reserve fuel reservoir means, a separate conduit communicatively connecting said last-named means with said cross-feed conduit, and a shut-off valve and a centrifugal pump interposed in said separate conduit, each of said aforementioned pumps being characterized by its ability to pass fuel in either direction when rendered inoperative whereby, upon proper setting of said control members, fuel may be transferred from any selected reservoir means whose associated pump has been rendered operative to any of the remaining reservoir means whose associated pump has been rendered inoperative and simultaneously delivered to any one or more of said outlet means.

12. A fuel supply system for multiengined aircraft comprising a plurality of fuel outlet means, a fuel reservoir means associated with each of said outlet means, an individual conduit communicatively connecting each of said outlet means with its associated reservoir means, a valve interposed in each of said conduits, each of said valves having a control member settable to any one of a plurality of positions, a motor driven pump interposed in said conduit between said valve and said reservoir means, each of said pumps being of the type which will permit fuel to flow freely therethrough in either direction when its driving motor is rendered inoperative, and a cross-feed conduit communicatively connected with each of said valves, whereby, upon proper manipulation of said control members, the pump associated with any selected reservoir means whose driving motor has been rendered operative may withdraw fuel from said selected reservoir means and deliver it to any of the remaining reservoir means whose associated pump motors have been rendered inoperative and also to any one or more selected outlet means.

13. A fuel supply system for multiengined aircraft comprising a plurality of fuel outlet means, a fuel reservoir means associated with each of said outlet means, an individual conduit communicatively connecting each of said outlet means with its associated reservoir means, a multiport valve interposed in each of said conduits, each of said valves having a control member settable to any one of a plurality of positions, a cross-feed conduit communicatively connected with one of the ports of each of said valves, a reserve fuel reservoir means, an individual conduit communicatively connecting said reserve fuel reserve means with said cross-feed conduit, a shut-off valve in said last named conduit, and a selectively operable pump interposed in each of said individual conduits between said reservoir means and said valves, each of said pumps being characterized by its ability to pass fuel freely in either direction when rendered inoperative, whereby, upon proper manipulation of said control members, fuel may be transferred from any selected reservoir means whose pump has been rendered operative to any of the remaining reservoir means whose pumps have been rendered inoperative.

14. A fuel supply system for multiengined aircraft comprising a plurality of fuel outlet means, a fuel reservoir means associated with each of said outlet means, an individual conduit communicatively connecting each of said outlet means with its associated reservoir means, a valve interposed in each of said conduits, each of said valves having a control member settable to any one of a plurality of positions, a cross-feed conduit communicatively connected with each of said valves, a reserve fuel reservoir means, and a shut-off valve communicatively connecting said reserve fuel reservoir means with said cross-feed conduit, said control members being individually settable so as to enable fuel to be transferred from any selected reservoir means to any selected outlet means.

15. A fuel supply system for multiengined aircraft comprising a plurality of fuel outlet means; a fuel reservoir means associated with each of said outlet means; and a valve interposed between each outlet means and its associated reservoir means, each of said valves comprising a multiport valve body having one port communicatively connected with the outlet means, a second port communicatively connected with the reservoir means, and a third port communicatively connected with a corresponding port of each of the other of said valves, and the valves having a positionable selector means for each valve for controlling the flow of fuel through said valve body and between said ports whereby fuel may be delivered from any selected reservoir means to any selected outlet means.

RALPH E. GREY.
EDWARD M. GAVIN.

REFERENCES CITED

The following references are of record in the file of this patent:

UNITED STATES PATENTS

| Number | Name | Date |
|---|---|---|
| 312,158 | Peeney | Feb. 10, 1885 |
| 1,329,997 | Page | Feb. 3, 1920 |
| 1,532,326 | Lent | Apr. 7, 1925 |
| 1,776,877 | Yonkese | Sept. 30, 1930 |
| 1,889,517 | Roessler | Nov. 29, 1932 |
| 2,024,133 | Harding | Feb. 23, 1937 |
| 2,170,136 | Gavin | Aug. 22, 1936 |
| 2,243,594 | De Voe et al. | May 27, 1941 |
| 2,268,957 | Muselier | Jan. 6, 1942 |